J. B. Wortendyke.
Mach. for Making Paper Twine.
No. 1,818. Reissued Nov. 8, 1804.
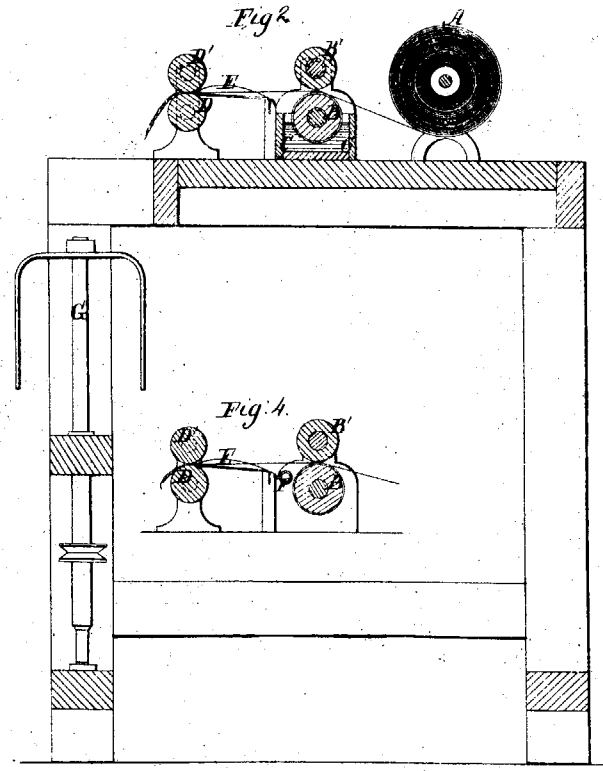
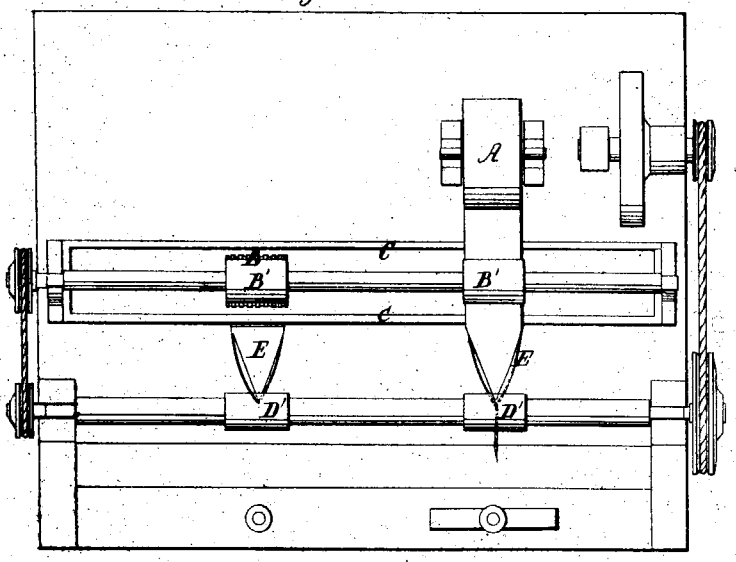
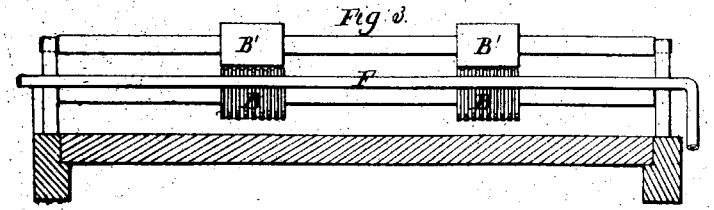
Witnesses
J. P. Hall
A. M. Langston
Inventor
John B. Wortendyke

UNITED STATES PATENT OFFICE.

JOHN B. WORTENDYKE, OF GODWINVILLE, NEW JERSEY.

IMPROVEMENT IN MACHINES FOR MAKING PAPER TWINE, &c.

Specification forming part of Letters Patent No. 4,289, dated May 24, 1834; Reissue No. 1,818, dated November 8, 1864.

DIVISION B.

*To all whom it may concern:*

Be it known that I, JOHN B. WORTENDYKE, of Godwinville, in the county of Bergen and State of New Jersey, have invented a new and useful Improvement in the Manufacture of Paper Twine or Cord; and I do hereby declare that the following is a full, clear, and exact description thereof, which will enable any person skilled in the art to make and use the same, reference being had to the accompanying drawings, forming a part of this specification, in which—

Figure 1 is a plan of a machine for making paper twine illustrating my invention. Fig. 2 is a transverse vertical section of the same. Fig. 3 is a front view illustrating a modification of the machinery employed in carrying out my invention. Fig. 4 is a transverse vertical section corresponding with Fig. 3.

Similar letters of reference indicate corresponding parts in both figures.

The object of this invention is to effect the manufacture of paper twine of good quality by machinery substantially like that employed in spinning cotton and other fibrous materials, consisting of rolls arranged substantially like the drawing-rolls of spinning-frames, and a throstle or spindle applied and operating substantially like those of such frames. The paper is cut into a strip or strips of proper width to form the twine and of as great length as possible and placed on a roll, whence it is taken by the aforesaid rolls.

In order to enable the paper to be well spun, it is moistened, and afterward gathered up laterally into the form of roping during its passage to or between the rolls, and it is in this moistening and lateral gathering up of the paper while it is on its way to the throstle or spindle that my invention consists.

In order to moisten the paper, I cause it to pass over a roller which rotates in a box or trough containing water and takes up a sufficient quantity of water to moisten the paper. To prevent this roller from applying too much water to the paper, my invention further consists in providing in this roller a series of circumferential grooves—that is to say, endless grooves—encircling the said roller. By thus grooving the roller its grooved parts are prevented from applying water to the paper, and the paper is thereby prevented from being so much moistened as to impair its tenacity in such a degree as to prevent its being successfully twisted or spun into twine or cord.

A is the roll, from which the paper is supplied, arranged behind the back pair of rolls, B B′, in bearings, in which it is free to turn easily to allow the paper to be drawn off as fast as required by means of the said rolls. These rolls may be of wood or other material, and the necessary pressure of the top roll, B′, may be obtained by any suitable system of loading. The lower roll, B, (represented in Figs. 1 and 2,) has arranged below it a trough or box, C, containing water, in which its lower part rotates, for the purpose of taking up a sufficient quantity for moistening the paper as it passes between the said roll and the upper roll, B′. To prevent the said roll B from taking up and applying to the paper sufficient moisture to impair its tenacity in too great a degree for the twisting operation, the said roll has provided in it a series of endless grooves extending circumferentially all around it, as shown at *v v* in the several figures of the drawings. The roll thus grooved will only apply the moisture from the surfaces between the grooves *v v*, but the moisture taken up from these surfaces will spread itself through the whole width of the paper.

Figs. 3 and 4 represent a perforated or finely-slit steam-pipe as a substitute for the trough C, the said pipe being arranged as close as practicable in front of the rolls B and B′, and in such a manner as to deliver the steam directly upon the under surface of the paper, and thereby moisten it as it emerges from between the said rolls.

Between the back rolls, B B′, and the front ones, D D′, there is arranged a taper spout-like guide, E, of tin-plate, or other metal or material, through which the paper (represented in yellow color) has to pass on its way from one pair of rolls to the other. The entrance of this guide is of a width not less than the full width of the strip or strips of paper of which the twine is to be made; but its outlet, which is brought as far as possible into the entrance between the rolls D D′, is very narrow, its width being in fact little, if any, greater than the thickness of the twine to be produced. The moistened paper, on being drawn through this, is gathered up laterally into the form of a roping, ready to be twisted by the throstle or spindle G after it has been delivered through the rolls D D′. A trumpet or funnel shaped passage may be substituted for the spout-like guide E, and will have the same effect.

The rolls B B′ and D D′ are or may be driven in the same manner as the back and front drawing-rolls of spinning-frames for spinning cotton and other fibrous substances, except that the front rolls do not require to have any higher velocity, as no draft is intended to be produced.

By the moistening of the paper on its way to the throstle or spindle by which it is spun into twine it is softened, and so enabled to be easily gathered up laterally in the form of roping and to be easily spun and retain its twist after being spun. By gathering up the strip or strips laterally into the form of roping the paper is enabled to be much better twisted. The moistening of the paper sufficiently with perfect uniformity can be much better effected while it is on its way from the roll A, or its equivalent, to the throstle or spindle, for if moistened while or before being placed on the roll it is not so easy to deliver the whole length of a piece at a uniform dampness.

The top roll, B′, may be dispensed with, as the paper will be moistened by passing over and in contact with the roll B without any top pressure.

The twine produced by my invention is very uniform and smooth and may be used as strands for cord.

What I claim as my improvement in the manufacture of paper twine, and desire to secure by Letters Patent, is—

1. The moistening of the paper of which the twine is to be formed while on its way to, over, or between the rolls by which it is delivered to the spindle or throstle by which the twisting is performed, substantially as herein described.

2. The employment, in a machine for making twine or cord from paper, of a taper guide, E, or other equivalent device, for gathering up the paper edgewise or laterally in the form of roping, substantially as herein described, on its way to a spindle, throstle, or other twisting device.

3. The grooving of the roller B, substantially as and for the purpose herein specified.

J. B. WORTENDYKE.

Witnesses:
HENRY T. BROWN,
J. W. COOMBS.